United States Patent Office
3,709,827
Patented Jan. 9, 1973

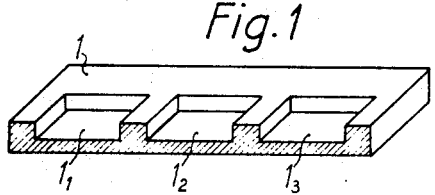
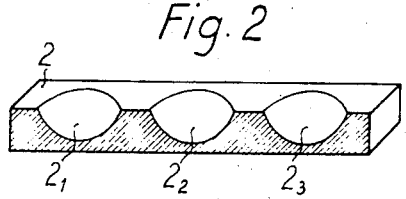
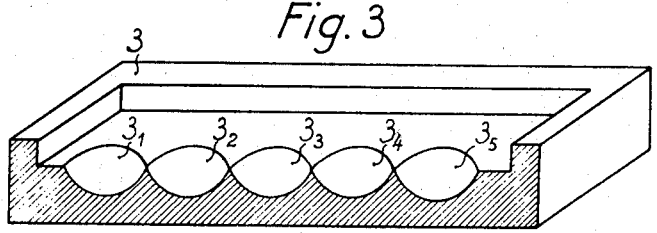
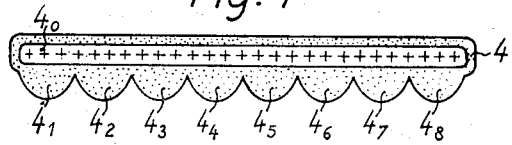
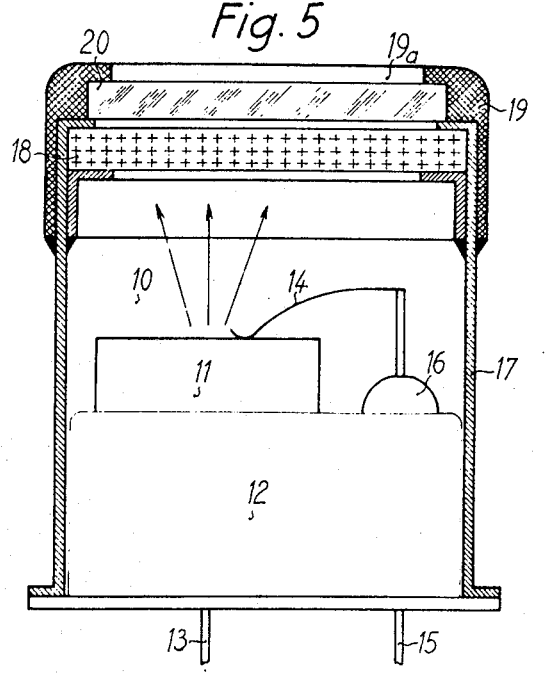

3,709,827
FLUORESCENT MATERIALS FOR OPTICAL FREQUENCY CONVERSION
Francois E. Auzel, 39 Avenue Port Royal des Champs, le Mesnil Saint-Denis, France
Filed Feb. 8, 1971, Ser. No. 113,317
Claims priority, application France, Feb. 10, 1970, 7004606
Int. Cl. C09k 1/06; C03c 3/28
U.S. Cl. 252—301.4 R                  6 Claims

ABSTRACT OF THE DISCLOSURE

Fluorescent material for the optical frequency conversion of near infrared radiation form 0.85 to 1.06 $\mu$m into visible radiation. The constituents of the material are (i) vitrifying fluorides of lead, beryllium and magnesium, (ii) devitrifying and activating fluoride of ytterbium and (iii) doping fluoride of erbium for a green and red response and doping fluoride of thulium for a blue response. The content of ytterbium fluoride controls the form of the material, either glassy ceramic or polycrystalline. Proper preparation conditions and proportions allow to prepare either a glass material or a ceramic material.

---

The present invention generally concerns the materials for optical converters and, more particularly, for optical converters which permit the conversion of near-infrared radiation (ca. 0.85 to 1.06 $\mu$m.) into visible radiation. The invention deals equally on one hand with the methods of producing these materials as well as the optical converters made therewith, and, on the other hand with certain applications thereof in devices which use them.

Optical converter materials and optical converter screens made therewith are known from French Pat. No. 1,532,609 filed June 1, 1967 by the present applicant. This patent discloses two materials having the following compositions:

(a) A mixed tungstate of an alkaline metal and of ytterbium, lightly doped by a mixed tungstate of an alkaline metal and erbium, a composition which results in a green response material;

(b) A mixed tungstate of an alkaline metal and of ytterbium, lightly doped by a mixed tungstate of an alkaline metal and of thulium, a composition which results in a blue response material.

The same patent gives quantitative formulas for the presented compositions, as well as their methods of preparation in powder form, and certain application thereof for the manufacture of screens which function as optical converters, e.g. by packing these powders between two glass plates which may be smooth and parallel, or by settling these powders on any convenient support and holding them in place by the use of a coat of a synthetic transparent resin.

The physical and photoluminescent phenomena thus produced have been the subject matter of two papers presented before the Paris Academy of Sciences, in 1966, tome 262, pp. 1016 to 1019, and tome 263, pp. 819 to 821. The above cited patent presents a simple model of the phenomenon which consists of irradiating an ion-pair ytterbrium-erbium or ytterbium-thulium in the near-infrared range.

Other compositions in mono-crystal form are now known which differ from the ones above only by the host utilized. The principal ones are:

(a) Simple lanthanum fluorides ($LaF_3$), gadolinium fluorides ($GdF_3$), yttrium fluorides ($YF_3$) doped with ytterbium ($Yb^{3+}$) and as the case may be with erbium ($Er^{3+}$) (for a green response) or with thulium ($Tm^{3+}$) (for a blue response), or holmium ($H^{3+}$) (for a red response);

(b) Mixed barium and yttrium fluorides ($BaYF_5$), mixed barium and lanthanum fluorides ($BaLaF_5$), doped with ytterbium and either erbium (for a green response), or thulium (for a blue response), or holmium (for a red response);

(c) Yttrium oxy-chlorides (YOCl, $Y_3OCl_7$), doped with ytterbium and erbium (for green response).

As regards these monocrystals which are drawn from a fusion-bath (a, b) or obtained through evaporation (c), pertinent references are as follows:

(a) Hewes and Sarver, "Bulletin of the American Physical Society," 1968, vol. 13, p. 687, and "Physical Review," June 1969, vol. 182, p. 427; Kingley, Fenner and Galginaitis, "Applied Physics," Aug. 15, 1969, p. 115;

(b) Guggenheim and Johnson, "Applied Physics Letters," June 15, 1969, pp. 51 and 52;

(c) Van Uitert, Singh, Levinstein, Johnson and Orodkiewicz, "Applied Physics Letters," June 15, 1969, pp. 53 and 54.

By concentrating on the ions erbium ($Er^{3+}$) and thulium ($Tm^{3+}$), but by utilizing new hosts which will be specified below, the applicant has obtained the following new results:

Noticeably modifying the relative intensities of the radiation emitted from the ion $Er^{3+}$ as a result of different energy levels, i.e. the properties of the ion itself, thus permitting the emission of at least one new color (green and red response instead of green response);

Utilizing the capability of the new hosts mentioned to be produced in the different forms of glass, glassy ceramics, or crystalline powders, hence permitting infinitely more sophisticated methods of manufacture, less cumbersome than drawing out monocrystals. This results notably in ceramics with superior efficiency for any given energizing power in comparison with mono-crystals and glass, and opens new developmental possibilities in the way of mixed glass-ceramic forms which will be discussed below.

The principal object of the invention is to provide new solid fluorescent material for applications in optical converters from near infrared radiations to visible radiation; another object of the invention is to provide methods of manufacturing said new infrared-visible converting fluorescent materials.

According to this invention, the fluorescent materials as well as the optical converters applying these materials and to be used for the conversion of the near-infrared band into visible radiation, are characterized in that they are made up of at least one of the following mixtures:

(a) Mixture of fluorides of lead, beryllium and magnesium, having vitrifying properties, ytterbium fluoride having devitrifying and activating properties and of erbium fluoride, a mixture which has a red and green response giving a yellow-orange color;

(b) Mixture of fluorides of lead, beryllium and magnesium, having vitrifying properties, ytterbium fluoride having devitrifying and activating properties and of thulium fluoride, a mixture which has a blue response;

(c) Mixture of fluorides of lead, beryllium and magnesium, having vitrifying properties, ytterbium fluoride having devitrifying and activating properties and of erbium and thulium fluorides, a mixture that has a red, green and blue response.

The fluorescent materials of the invention can be obtained in the form of glass, of more or less glassy ceramics, and of crystalline powder by a proper selection of the ytterbium fluoride content and the cooling conditions of the melted mixture.

The fluorescent materials therefore include fluorides of three kinds:

Three fluorides with vitrifying properties constituting the "body" of the material, no matter what the final physical form of the material is going to be; these fluorides have been selected in such a way that the practical energy efficiency of the final material be the best possible;

A devitrifying and activating fluoride; it is said to be devitrifying because its concentration enables the composition to take the form of glass or ceramic on the one hand, or the powdery form on the other hand; it is said to be activating because its presence is necessary for the optical conversion by permitting coupling between the ytterbium ion $Yb^{3+}$ at least one other ion of a rare earth element.

At least one doping fluoride, namely that of erbium and (or) that of thulium, the corresponding rare earth ions $Er^{3+}$ and (or) $Tm^{3+}$ cooperating by coupling with that of ytterbium in order to assure the conversion of infrared radiation into visible radiation the spectral composition of which will depend upon the nature of the doping ions.

According to another feature of the invention the finished compositions contain on one hand 20 to 45% by weight of lead fluoride, 20 to 40% of beryllium fluoride and 5 to 20% of amgnesium fluoride and less or more than 20% of ytterbium fluoride, depending upon whether the solid form to be obtained is a glass or a more or less glassy ceramic on the one hand or a crystalline powder on the other hand. Selection between a glass material or a ceramic material depend upon the cooling conditions of the melted material.

According to another feature of the invention the compositions are such that the proportion of doping fluorides amounts to 1 to 4 atom-grams of erbium fluoride and (or) 0.25 to 1 atom-gram of thulium fluoride per liter of the finished material.

It can be demonstrated that at a macroscopic scale, taking into account the statistical behavior of all the various ions, the radiation intensity $I_{GR}$ of the green and red light (seen as a yellow-orange light) emitted by the fluorescent material varies proportionally to the square of the incident infrared radiation intensity $I_{IR}$ hence accroding to the formula:

$$I_{GR} = A_{GR} I_{IR}^2$$

whereby $A_{GR}$ is a constant which at constant temperature depends only upon the dope concentration, and the radiation intensity $I_B$ of the emitted blue light varies proportionally to the cube of the incident infrared intensity $I_{IR}$, hence according to the formula:

$$I_B = A_B I_{IR}^3$$

whereby $A_B$ is a constant which at constant temperature depends only upon the proportion of the dope.

For a mixed material responding simultaneously to infrared irradiation with yellow-orange and with blue light, one can write:

$$I_{GR} - I_B = I_{IR}^2 (A_{GR} - A_B I_{IR})$$

indicating that the yellow-orange light is more intensive than the blue light when the intensity of the infrared beam is such that:

$$I_{IR} < A_{GR}/A_B$$

and the opposite is true, i.e. the blue light is more intensive than the yellow-orange light, when the intensity of the infrared beam is such that $$I_{IR} > A_{GR}/A_B$$

Therefore, the resulting light color depends upon the energizing power.

The theoretical conversion efficiency, i.e. the ratio of emitted visible radiation power to infrared radiation power is limited by the production of phonons to:

68% for the blue light (ion $Tm^{3+}$)
90% for the green light (ion $Er^{3+}$)

Similarly, it can be shown that the theroetical conversion efficiency is limited to 74% for the red light (ion $Er^{3+}$).

Further efficiency restrictions may result from the absorption saturation of the ytterbium ion $Yb^{3+}$ which is expected to occur for an infrared radiation power of several tens of kilowatts per cubic centimeter. As long as no such magnitudes of power are attained the conversion efficiency can principally be increased, provided that the generated heat can be eliminated as quickly as it is formed. In reality, however, the practical conversion efficiency limits are due to one or the other of the two causes mentioned above depending upon whether the conversion process follows the quadratic or the cubic law. In the case of the green conversion an efficiency of $7.10^{-6}$ was measured for a large band energization power density of 250 mw./cm.$^3$ which by way of a linear extrapolation (quadratic law) suggests for an irradiation limit of 20 kw./cm.$^3$ a practical maximal efficiency of 56%, an efficiency that is below the theoretical value.

In the case of the blue emission an efficiency of $3.10^{-7}$ was obtained for the same excitation power density of 250 mw./cm.$^3$ which by way of a quadratic extrapolation (cubic law) indicates an efficiency of 68%, equal to the theoretical yield up to an energizing power density of 365 w./cm.$^3$ at which point saturation starts to occur.

The method of preparing the fluorescent materials of the invention and the optical converters including the same comprises the following steps:

(a) The vitrifying fluorides are mixed first in the cold and as powders, then ytterbium fluoride is added to this mix, followed by the addition of erbium and (or) thulium fluoride and mixed;

(b) The thus obtained mixture is heated to about 1200° C. for about 6 minutes in a muffle oven in order to melt it;

(c) The product is allowed to cool slowly at room temperature to about 500° C.;

(d) The product is then given the desirable shape.

The last step of the process can be varied in order to obtain the desired form of the finished material:

($e_1$) Glass: the product is poured at 500° C. into a mold with a jacket as of steel, uniformly heated to about 100° C. and maintained there until the mixture has solidified, whereupon it is allowed to cool further to room temperature;

($e_2$) Ceramic, more or less glassy; one proceeds as with the glass, but with one essential difference, the mold is uniformly preheated to 250° C. and is maintained at this temperature until the mixture has solidified;

($e_3$) Cake with a glass mantle and a ceramic centerpiece: again one proceeds as with the glass, but one chooses a relatively deep mold, so that the liquid in contact with the mold wall will vitrify whereas the center portion will transform into ceramic;

($e_4$) Crystalline powder: the last step of the general process is simplified to the point that the product is left to cool to room temperature in the fusion crucible itself and it is then treated so it can serve at least for one of the methods of a group that comprises (a) packing between two thin smooth parallel, transparent glass plates, (b) sedimentation and coating by a transparent, synthetic resin, (c) suspension in a transparent gel; in this instance there is no vitrification, not even partial vitrification;

($e_5$) Cake with a glass coating which is lenticular on one side and with a ceramic body inside. The glass lenses can be utilized to concentrate the infrared excitation radiation. One proceeds as with the previous cake ($e_3$) using a honeycomb mold instead. Taking into account the refraction index of the finished glass of the order of 1.37 and the calculated distance of the infrared source of radiation, the honeycomb cavities will have the desired curvature radius in order for the radiation to focus in the inner bordering ceramic behind the lenses.

The optical converters according to this invention are parts that are apt to be used in numerous optical systems, such as, among others:

Luminous marks for illumination or for signalling, for instance in telephone switchboards, automobile and airplane dashboards, instrument panels of satellites, data visualization consoles for calculators;

Screens for the detection of infrared radiation;

Low definition television receivers with flat screens.

As already discussed, the conversion efficiency increases with the infrared radiation intensity which irradiates an optical converter. There is therefore an inducement to spectrally concentrate said irradiation.

A photodiode with an emission band as narrow as possible, centered upon a wavelength close to 0.97 μm. must be selected since the value of the wavelength of optimal sensitivity depends largely upon the ytterbium ion's ($Yb^{3+}$) own properties and the maximal energization of the optical converters of the invention is obtained with a radiation of 0.97 μm. wavelength. Nevertheless a satisfactory energization can be obtained by a radiation of wavelength of between 0.92 and 1 μm. Thus, the classical diodes of the gallium arsenide type are not convenient as excitation sources since their radiation has a wavelength 0.90 μm. It is possible though to use gallium arsenide diodes doped with silicon, since the radiation it emits has a wavelength that falls within the lower bracket of the range mentioned above. For instance, it is possible to use:

the photodiode PEX 1206 of the Texas Instrument Inc. (0.93 μm.)
the photodiode SSL 15 of the General Electric Company (0.94 μm.)

But it is still preferable for the sake of the optical converters of this invention to make diodes the radiation of which center upon the wavelength of 0.97 μm.

It is now known that the wavelength of the radiation emitted by the semiconductor diodes made up of alloys of ternary compounds of III–V elements (III and V designate the group in the Periodic Table of the elements) can be varied simply by varying the relative composition of each alloy. The energy gap of the alloy varies substantially linearly with its mole composition between the energy gaps of its individual constituents.

Alloys which are convenient for making diodes whose radiation centers reasonably close upon the 0.97 μm. wavelength are:

(1)—the indium phosphorus-arsenic alloy of the formula $$In(P_xAs_{1-x})$$

where $$0.98 < x < 1$$

On this subject one can refer to the paper of F. B. Alexander, "Applied Physics Letters," vol. 4, 1964, p. 13.

(2)—the arsenic-indium-gallium alloy of the formula $$As(In_xGa_{1-x})$$

where $$0.005 < x < 0.15$$

On this subject one can refer to the paper by I. Melengailis, A. I. Strauss, R. H. Rediker, "Proceedings of the I.E.E.E.," August 1963, p. 1154.

(3)—the antimony-aluminum-gallium alloy of the formula $$Sb(Al_xGa_{1-x})$$

where $$0.37 < x < 0.74$$

On this subject one can refer to the paper by I. I. Bardiyan, "Fizika Tverdogo Tela," vol. 1, No. 9, Moscow, September 1959, p. 1360.

Since a semi-conductor diode can attain a luminous efficiency of 10% the optical converters of this invention asymptotically permit the attainment of a total electroluminous efficiency of 5 to 7%.

The invention will be more easily understood by reading the detailed description below of several of its embodiments together with the accompanying drawings in which:

FIGS. 1 to 3 are views in perspective of partially cut molds which are used to cast optical converters which respectively have the shape of glass plates with parallel faces, lenses, screens with a lenticular face of glass and an inner ceramic body;

FIG. 4 represents a cut through a screen in accordance with the invention as it was produced by means of the mold in FIG. 3; and FIG. 5 represents a schematic view of a cut through a luminous mark in accordance with the invention, involving an infrared source, an optical converter of ceramic material and an optical filter.

EXAMPLE 1

Fluorescent material with a green and red response

Composition of the material:

|  | Grams |
|---|---|
| Beryllium fluoride in form of a mixture ammonium fluoride and beryllium fluoride $NH_4 \cdot BeF_4$ | 3,633 |
| Magnesium fluoride | 0,683 |
| Lead fluoride | 9,808 |
| Ytterbium fluoride | 4,598 |
| Erbium fluoride | 1,192 |

EXAMPLE 2

Fluorescent material with a blue response

Composition of the material:

|  | Grams |
|---|---|
| Beryllium fluoride in form of a mixture of ammonium fluoride and beryllium fluoride $NH_4BeF_4$ | 3,633 |
| Magnesium fluoride | 0,683 |
| Lead fluoride | 9,808 |
| Ytterbium fluoride | 4,598 |
| Thulium fluoride | 0,149 |

EXAMPLE 3

Fluorescent material with a red, green and blue response

Composition of the material:

|  | Grams |
|---|---|
| Beryllium fluoride in form of a mixture of ammonium fluoride and beryllium fluoride $NH_4BeF_4$ | 3,633 |
| Magnesium fluoride | 0,683 |
| Lead fluoride | 9,808 |
| Ytterbium fluoride | 4,598 |
| Erbium fluoride | 1,192 |
| Thulium fluoride | 0,149 |

We now refer to FIGS. 1 through 3 which give examples of molds that can be used to cast the mixtures for forming the optical converters.

Mold 1 of FIG. 1 is formed with rectangular cells $1_1$–$1_3$; however, these sections might as well assume other geometric shapes; here, the rectangular section permits the casting of the plates with parallel faces of glass or ceramic. Mold 2 of FIG. 2 is formed with cavities $2_1$–$2_3$ in form of a portion of a sphere which are used to produce glass plano-convex lenses; the curvature radius of the cavities and hence of the convex faces of the lenses determines the convergence-value of the lenses, taking into account that the refractive index of the finished glass product is of the order of 1.37.

The mold 3 of the FIG. 3 has cavities $3_1$–$3_3$ which are analogous to those of the mold in FIG. 2, but it is deeper and is intended to be used for the production of a "mixed cake" 4 (see FIG. 4) having an inner ceramic body $4_0$ enrobed in glass, whereby the glass envelope has on one of its faces an array of regularly distributed lenses $4_1$–$4_8$. Again taking into account the refractive index of the finished glass of about 1.37 and the anticipated position of the infrared source on the axis of each lens, the curvature radius of the mold cavities and hence of the finished lenses of the cake can be so chosen as to allow focussing of the infrared irradiation in the subjacent ceramic layer $4_0$.

FIG. 5 relates to a luminous mark for signal boards. It essentially comprises a solid state source of infrared radiation, preferably, a photodiode of the infrared semiconductor type, and an optical transformer in accordance with the invention.

More precisely, a photodiode 11 is placed on a metallic base 12 with two terminals 13 and 15. The photodiode is soldered onto the base. A gold wire 14 is attached to the upper surface of the diode and to terminal 15 and is isolated from base 12 by means of a glass pearl 16. The diode 11 and its base 12 are covered by a metallic hood 17. The top of the hood 17 consists of an optical converter in accordance with the invention, in this case, a ceramic plate with parallel faces 18. A metallic lid 19 whose bottom has a circular opening 19a fits into the upper end of the hood 17. This lid holds an optical filter 20 known in the prior art in case it should be required. Such a luminous mark can emit visible light of five different colors:

(1) Blue: plate 18 thulium-doped, only; no filter 20
(2) Green: plate 18 erbium-doped, only; filter 20 green
(3) Yellow-orange: plate 18 erbium-doped, only; no filter 20
(4) Red: plate 18 erbium-doped, only; filter 20 red
(5) White or blue or yellow/orange: plate 18 erbium and thulium-doped depending upon intensity; no filter 20

Several changes can be made in the structure of the luminous mark of FIG. 5:

(1) The homogeneous plate 18 can be replaced by a plate of the mixed glass-ceramic type (of FIG. 4) with plano-convex glass lenses facing the diode; the luminosity of such a mark will be noticeably increased for reasons already discussed;

(2) While using a homogeneous ceramic plate 18 with parallel faces the diode 11 can be replaced by a prior art diode, a so-called dome-diode, such as the PEX 1206 of the Texas Instrument Inc.; this diode has its own source of radiation in the center of a portion of sphere of transparent semiconductor material; by giving the hood convenient dimensions, the infrared radiation emitted by the diode can be focussed in the plate 18.

(3) The interior of the hood 17 can be filled entirely with a translucid silicone gel which opens up two possibilities:
the gel can contain grains of a crystalline powder according to the invention in suspension and thus play the role of an optical converter;
the gel can contain a suitable dye permitting it to play the role of optical filter.

For the sake of the appended claims, it is to be noticed that a concentration of $x$ atom-grams per liter correspond to a concentration of $x \times N/10^3$ par cm.$^3$ where is Avogadro's number equal to $6 \times 10^{23}$.

What I claim is:

1. Fluorescent material for optical conversion of a near infrared radiation from 0.85 to 1.05 μm. into visible radiation, said material including as constituents a mixture of the fluorides of lead, beryllium, and magnesium having vitrifying properties, fluoride of ytterbium having devitrifying and activating properties, and the fluoride of at least one metal selected from the group of metals having doping properties and consisting of erbium which gives a red and green response, and thulium which gives a blue response, in which the constituent weight percentages are 20 to 45% of lead fluoride, 20 to 40% of beryllium fluoride and 5 to 20% of magnesium fluoride, and in which the complement to 100% of the sum of said percentages consists of ytterbium fluoride, and said at least one metal having doping properties, said ytterbium and said at least one metal being present in fluorescence activating quantities and doping quantities respectively.

2. Fluorescent material as set forth in claim 1, in which the sum of said constituent weight percentages of lead fluoride, beryllium fluoride and magnesium fluoride exceeds 80%, whereby the material is in the form of a glassy ceramic.

3. Fluorescent material as set forth in claim 1 in which the sum of said constituent weight percentages of lead fluoride, beryllium fluoride and magnesium fluoride is lower than 80% whereby the material is in polycrystalline form.

4. Fluorescent material as set forth in claim 1 in which the doping metal is erbium and its concentration is from $6 \times 10^{20}$ to $24 \times 10^{20}$ atoms per cm.$^3$ of the material.

5. Fluorescent material as set forth in claim 1 in which the doping metal is thulium and its concentration is from $1.5 \times 10^{20}$ to $6 \times 10^{20}$ atoms per cm.$^3$ of the material.

6. Fluorescent material as set forth in claim 1 in which the doping metals are erbium at a concentration of $6 \times 10^{20}$ to $24 \times 10^{20}$ atoms per cm.$^3$ and thulium in the concentration of $1.5 \times 10^{20}$ to $6 \times 10^{20}$ atoms per cm.$^3$ of the materials.

References Cited

UNITED STATES PATENTS

| | | | |
|---|---|---|---|
| 2,466,506 | 4/1949 | Sun et al. | 106—47 R |
| 2,466,509 | 4/1949 | Sun | 106—47 R |
| 3,533,956 | 10/1970 | Snitzer | 252—301.4 R |
| 3,541,018 | 11/1970 | Hewes et al. | 252—301.4 R |

FOREIGN PATENTS

| | | | |
|---|---|---|---|
| 1,527,101 | 4/1968 | France | 252—301.4 R |

ROBERT D. EDMONDS, Primary Examiner

U.S. Cl. X.R.

106—47 R